Oct. 28, 1958 A. J. REINERT 2,857,754
FILED WALL WITH FIXTURE SECURED THERETO BY FASTENER
Filed Jan. 16, 1956
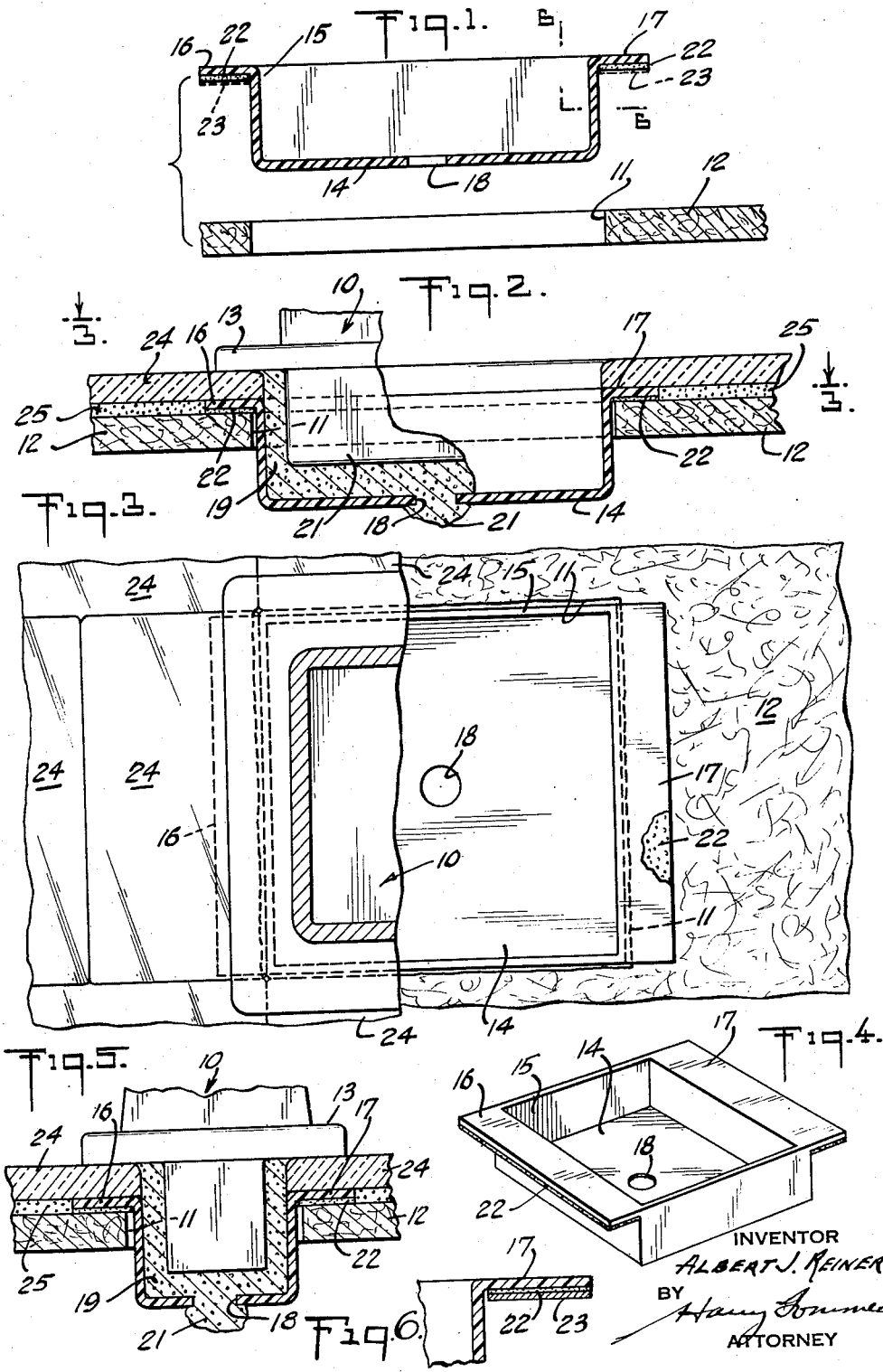
INVENTOR
ALBERT J. REINERT
BY
ATTORNEY

United States Patent Office 2,857,754
Patented Oct. 28, 1958

2,857,754

TILED WALL WITH FIXTURE SECURED THERETO BY FASTENER

Albert J. Reinert, Westwood, N. J.

Application January 16, 1956, Serial No. 559,214

1 Claim. (Cl. 72—18)

This invention relates to a wall fixture fastener of novel construction for securing wall fixtures, such as are popularly made of porcelain and other materials, to the apertures of wall members. The invention is particularly directed to a novel fastener means and method for the purpose mentioned, enabling the accurate anchoring of such fixtures to tile walls while assuring the accurate registry of the fixture with the tile wall and the permanent fastening of the fixture thereto.

These and other advantageous objects, which will appear from the drawings and from the description hereinafter, are accomplished by the structure of my invention, of which an embodiment is illustrated in the drawings. It will be apparent, from a consideration of said drawings and the following description, that the invention may be embodied in other forms suggested thereby, and such other forms as come within the scope of the appended claims are to be considered within the scope and purview of the instant invention.

In the drawings:

Fig. 1 is a medial, vertical sectional view of a rectangular member used in carrying out the invention, shown about to be positioned in the aperture of a well member, Fig. 2 is a medial, sectional view, showing a wall fixture secured to a wall member pursuant to the invention, Fig. 3 is a fragmentary, plan view taken on line 3—3 of Fig. 2, Fig. 4 is a perspective view of the rectangular member shown in Fig. 1, Fig. 5 is a medial, sectional view corresponding generally to Fig. 2 but showing the use of the invention in securing a fixture having a stud member of different proportions, than that shown in Fig. 2, and Fig. 6 is a fragmentary, enlarged elevational view taken on line 6—6 of Fig. 1.

As shown in the drawings, the device of this invention comprises a wall fixture fastener for securing a fixture, such as shown in Fig. 2 and designated by the reference character 10 to the apertured portion 11 of a wall member such as 12, which may be of any popular type such as, for example, the popular sheet rock wall member. It will be apparent that the invention is adapted for use with an apertured or recessed portion of any type of wall member.

Pursuant to the invention, the base 13 of the fixture 10 is secured substantially flush with the wall member overlying said aperture as follows: A rectangular housing member 14 which may be proportioned as shown in Figs. 2 and 4 or Fig. 5, or may be of any other design of a convenient outline, is provided open at only one face 15 thereof. While said housing member is shown as rectangular in Figs. 2 and 4, it may be of circular or other outline and is preferably provided with flanges 16, 17 extending from two sides thereof to overlap the marginal edges of the aperture (Fig. 2). The housing member is preferably provided with small aperture 18 of substantially lesser proportions than the open face 15 of the housing member, so that after the housing member is inserted into the aperture 11 of the wall member, a batch of cementitious material 19 may be positioned in the housing member, and the fixture 10 inserted therein in place, forcing the surplus material out of the small aperture 18 as indicated at 20 and locking the fixture therein. For original installations wherein a tile wall is desired, housing 24 may be secured to an opening in the wall member, tile members being then positioned over the flanges of the housing 24 a quantity of cementitious material inserted into housing 24 and the fixture 10 being then positioned in the housing 24 (Fig. 5) or an opening may be cut in a completed tile wall and the housing 24 positioned in such opening, with the flanges of housing 24 disposed on the marginal edges of the tile members at said opening, the fixture 10 being then inserted into the housing, the base 13 of the fixture covering said flanges. Wall fixtures, such as those to which the present invention relates, are conventionally provided with studs 21 below the base 13 and such studs may be of any depth. The small aperture 18 is preferably disposed in the side of the housing member opposite the open face 15 thereof. The flanges 16, 17 may extend from two opposite sides of the housing member and an adhesive coating 22 may be applied to the underside of the flanges to further facilitate securing them and thereby the housing member over the marginal edges of aperture 11 in the wall member (Figs. 2 and 5). The housing member 14 may be made of plastic, metal or other suitable material and may have applied thereto the adhesive layer 22 in the form of a pressure sensitive layer which may have a protective strip 23 superposed thereover and adapted to be manually stripped therefrom to expose the adhesive layer.

By the herein described structure and means, the wall fixture may be accurately secured to the wall member and in clean, permanently registered relation to the tile members, the result being an accurate and workmanlike job as distinguished from the present makeshift expedients which are frequently resorted to for the purpose and which often result in not only misalignment of the wall fixtures but also in their ultimate loosening and dislodgement. In the Fig. 5 illustration of the invention, parts corresponding to those in Fig. 2 are correspondingly marked, for facility of reference.

Having thus described my invention, what I claim as new and desire to secure by Letters Patent is:

In combination, a wall fixture having a marginal flange at its base portion and a stud depending from the base portion, a wall member having an opening, a fastener for the wall fixture comprising a substantially rectangular shaped receptacle open at its outer face and being substantially closed at its inner side and bottom faces and seated in said apertured wall member, flanges extending from the opposite sides of the receptacle at the outer edge thereof and being secured to the marginal portions of the wall member adjacent the wall opening, a layer of tiles secured to the outer face of the wall member, certain of the tiles overlying the marginal flanges on said receptacle and defining an entrance to said receptacle, said stud being positioned in said receptacle and fixedly cemented therein, with the marginal flange on the wall fixture overlying the tile.

References Cited in the file of this patent

UNITED STATES PATENTS

| | | |
|---|---|---|
| 933,163 | Davis | Sept. 7, 1909 |
| 1,239,076 | Baker | Sept. 4, 1917 |
| 1,966,167 | Denk | July 10, 1934 |
| 2,013,736 | Stirrup | Sept. 10, 1935 |
| 2,586,178 | Rochester | Feb. 19, 1952 |
| 2,618,959 | Watkins | Nov. 25, 1952 |
| 2,637,995 | Mann | May 12, 1953 |